A. S. KROTZ.
AUTOMOBILE.
APPLICATION FILED DEC. 16, 1908.
1,040,697.
Patented Oct. 8, 1912.
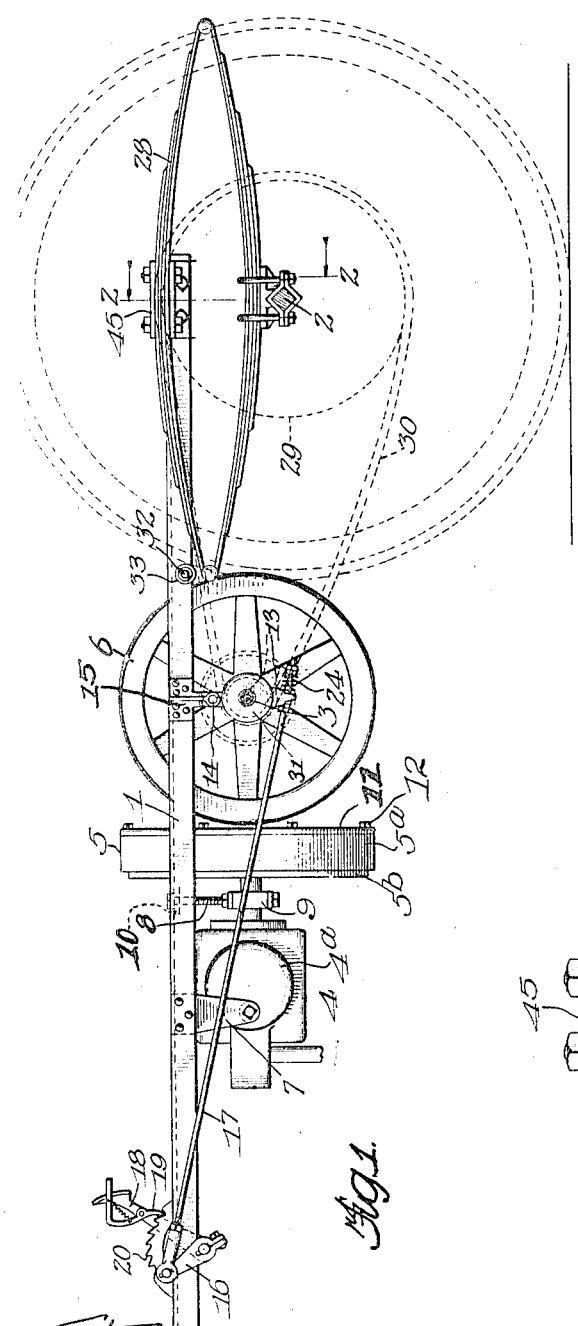
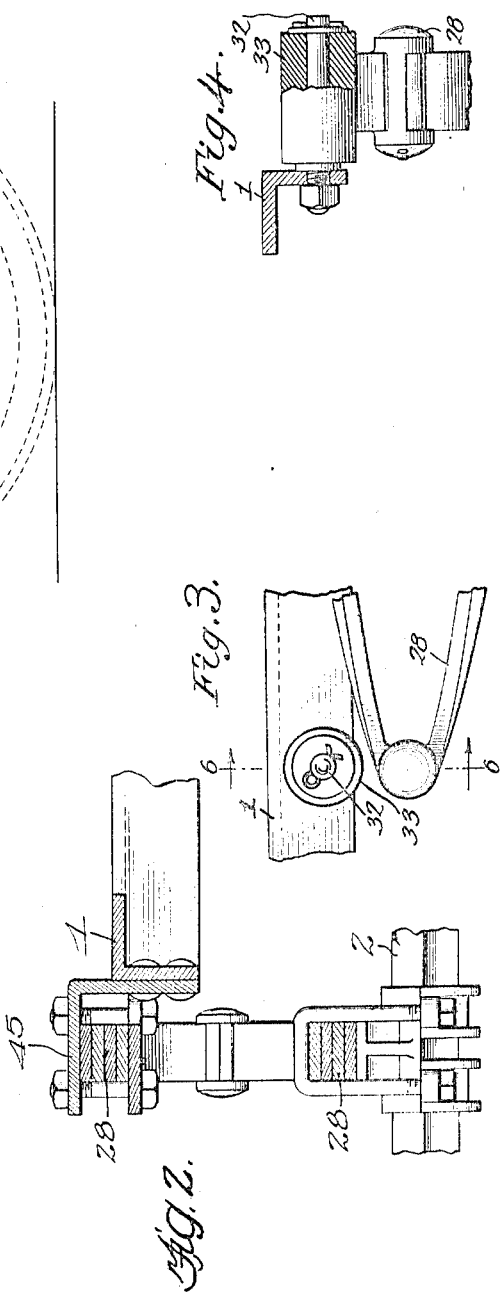
Witnesses:
P. Paul Parker
Robert H. Weir
Inventor:
Alvaro S. Krotz
By Luther L. Miller
Atty.

UNITED STATES PATENT OFFICE.

ALVARO S. KROTZ, OF CHICAGO, ILLINOIS, ASSIGNOR TO SEARS, ROEBUCK & COMPANY, OF CHICAGO, ILLINOIS, A CORPORATION OF NEW YORK.

AUTOMOBILE.

1,040,697.  Specification of Letters Patent.  Patented Oct. 8, 1912.

Application filed December 16, 1908. Serial No. 467,966.

*To all whom it may concern:*

Be it known that I, ALVARO S. KROTZ, a citizen of the United States, residing at Chicago, in the county of Cook and State of Illinois, have invented certain new and useful Improvements in Automobiles, of which the following is a specification.

One of the objects of the invention is to obviate the necessity, in a chain-driven car, of using a radius rod or strut.

A general object is to provide a transmission or drive which shall be flexible enough to accommodate itself to sudden strains and shocks, whereby breakage and noise are reduced to a minimum.

The invention also relates to the other improvements and advantageous features of construction herein shown and described.

In the accompanying drawings Figure 1 is a fragmental side elevation of the running gear of a motor vehicle embodying the features of my invention. Fig. 2 is a section on dotted line 2 2 of Fig. 1. Fig. 3 is a detail view of one of the stops for the vehicle springs. Fig. 4 is a section on line 6 6 of Fig. 3.

That embodiment of my invention which is herein illustrated comprises a chassis having longitudinal sills 1, 2 indicating the rear axle, 3 the drive shaft, and 4 the engine. I have herein shown a frictional driving connection between the engine and the drive shaft comprising the engine fly-wheel or friction disk 5, and a friction wheel 6 mounted upon the shaft 3, said friction wheel being arranged for peripheral contact with the face of the friction disk 5. The friction wheel 6 may be moved longitudinally of the shaft 3 to obtain various speeds forward and backward in the customary way, such means not being illustrated, as it forms no part of the present invention.

The engine herein shown comprises two opposed cylinders 4ª arranged transversely of the chassis. I preferably support the engine by means of brackets 7 secured to the sills 1 and pivotally connected with the outer ends of the cylinders 4ª, and a hanger 8 supporting the bearing 9 of the engine shaft and adjustably connected with a cross bar 10 of the chassis. It will thus be seen that the engine has a three-point support in the chassis, and that by adjusting the hanger 8, the engine may be positioned so that the axis of the engine shaft intersects the axis of the drive shaft 3. This manner of supporting the engine obviates the necessity for extreme nicety in the manufacture of the engine supports or in mounting the engine on the car.

The fly-wheel 5 may be faced with a removable wear plate 11 of suitable material, the preferred material being cold-rolled aluminum. The plate 11 is secured to the fly-wheel 5 by means of screws 12. It will be seen that said wear plate may be removed and reversed, or a new plate substituted for it, at slight expense of time and labor.

The drive shaft 3 is herein represented as suspended from the longitudinal sills 1 by means of bearing members 13 hinged at 14 to hangers 15 fixed to said sills. The means just described for supporting the shaft 3 permits of moving said shaft into and out of driving connection with the fly-wheel 5. The means herein shown for thus moving the shaft 3 comprises a crank arm 16 pivotally mounted on the chassis and connected to the lower end of one of the bearing members 13 by means of a link 17. Preferably a crank arm 16 and a link 17 are provided for each end of the shaft 3, the crank arms being fixed with relation to each other. Connected with the crank arms 16 is suitable controlling means, such as a foot-lever 18 fixed with relation to said crank arms and carrying a detent 19 adapted to engage a segment 20.

The chassis is supported upon the axles in any suitable way, as by means of springs 28, only one of which springs is shown in the drawing. The spring 28, in this instance, is of elliptical form, the lower half being rigidly secured to the axle 2 and the upper half being firmly connected to the adjacent sill 1. Fixed in any suitable way with relation to each drive wheel is a sprocket wheel 29 that carries a drive chain 30 extending over the sprocket wheel 31 mounted upon and suitably connected with the drive shaft 3. Fixed to and projecting outwardly from the sill 1, near the forward end of the spring 28, is a stud 32 which may have a suitable yielding covering 33 (Fig. 4). The stud 32 is in position to overlie and to come in contact with the forward end of the spring 28 and thereby limit the upward movement of the forward end of said spring, and consequently the forward movement of the axle 2 with relation to the body of the vehicle. It will thus be seen that the forward half of the lower portion of the spring 28 serves as a radius rod to hold the drive shaft 3 and the axle 2 at the proper distance apart. It will be understood that the spring 28, while efficiently serving as a radius rod, possesses important advantages over such rods, inasmuch as being more flexible, it is better able to withstand severe stresses without breakage, and will not rattle.

In order to permit of taking up excessive slack the operative position of the shaft 3 may be shifted forwardly by means of the foot lever 18. To this end, the fly-wheel 5 may be formed in two sections $5^a$ and $5^b$, the section $5^a$ being made adjustable toward and away from the section $5^b$ by any suitable means (not shown) to correspond with the altered forward position of the shaft 3.

It will be understood that various changes may be made in the embodiment shown and described without departing from the spirit of the invention. I therefore desire not to be limited to the details of construction herein set forth.

Some of the structure herein disclosed is claimed in a divisional application, Serial No. 535,220, filed December 27, 1909.

I claim as my invention:

1. In an automobile, the combination with a chassis, of driving means carried by said chassis; a driving axle operatively connected with said driving means; a spring comprising two portions, the lower portion being connected with said axle, the other portion being connected with said chassis, and adjacent ends of said portions being connected together; and a member rigidly fixed on said chassis and arranged to come in contact with said connected ends, but unconnected with said ends, for limiting upward movement of said connected ends.

2. In an automobile, the combination with a chassis, of driving means carried by said chassis; a driving axle operatively connected with said driving means; a spring comprising two portions, the lower portion being connected with said axle, the other portion being rigidly connected with said chassis; and adjacent ends of said portions being connected together, and a stop rigidly fixed to and projecting outwardly from said chassis in position to overlie and to come in contact with said connected ends.

ALVARO S. KROTZ.

Witnesses:
 WALTER L. HUDSON,
 GEORGE L. CHINDAHL.